United States Patent [19]
Biek

[11] Patent Number: 5,479,879
[45] Date of Patent: Jan. 2, 1996

[54] BIRD FEEDER

[76] Inventor: Jack J. Biek, 25340 Peavine St., Cassopolis, Mich. 49031

[21] Appl. No.: 309,536

[22] Filed: Sep. 20, 1994

[51] Int. Cl.⁶ ................................................ A01K 39/012
[52] U.S. Cl. ............................................................ 119/52.2
[58] Field of Search .................................. 119/52.2, 52.3, 119/53, 54, 57.8, 57.9, 61, 77, 23, 707

[56] References Cited

U.S. PATENT DOCUMENTS

| | | | |
|---|---|---|---|
| 3,083,687 | 4/1963 | Slaven | 119/57.8 X |
| 3,090,354 | 5/1963 | Merritt et al. | 119/52.3 X |
| 3,117,554 | 1/1964 | Taylor | 119/57.9 X |
| 3,125,069 | 3/1964 | Fowler | 119/77 |
| 3,643,632 | 2/1972 | Poirot | 119/54 |
| 4,732,112 | 3/1988 | Fenner et al. | 119/52.2 |
| 4,945,859 | 8/1990 | Churchwell | 119/54 X |
| 5,085,173 | 2/1992 | Powers | 119/54 X |
| 5,140,945 | 8/1992 | Barnhart et al. | 119/53 X |

Primary Examiner—Gene Mancene
Assistant Examiner—Thomas Price
Attorney, Agent, or Firm—Baker & Daniels

[57] ABSTRACT

A bird feeder that dispenses feed according to the weight and motion of feeding birds. The movement of feeding birds dispenses the proper amount of feed from the feed container, and the feeder adjusts to accommodate the type of feed being used and the weight and number of birds using the feeder. The feed container is adapted from a common two liter beverage container, which can simply be recycled when it becomes damp or dirty.

7 Claims, 4 Drawing Sheets

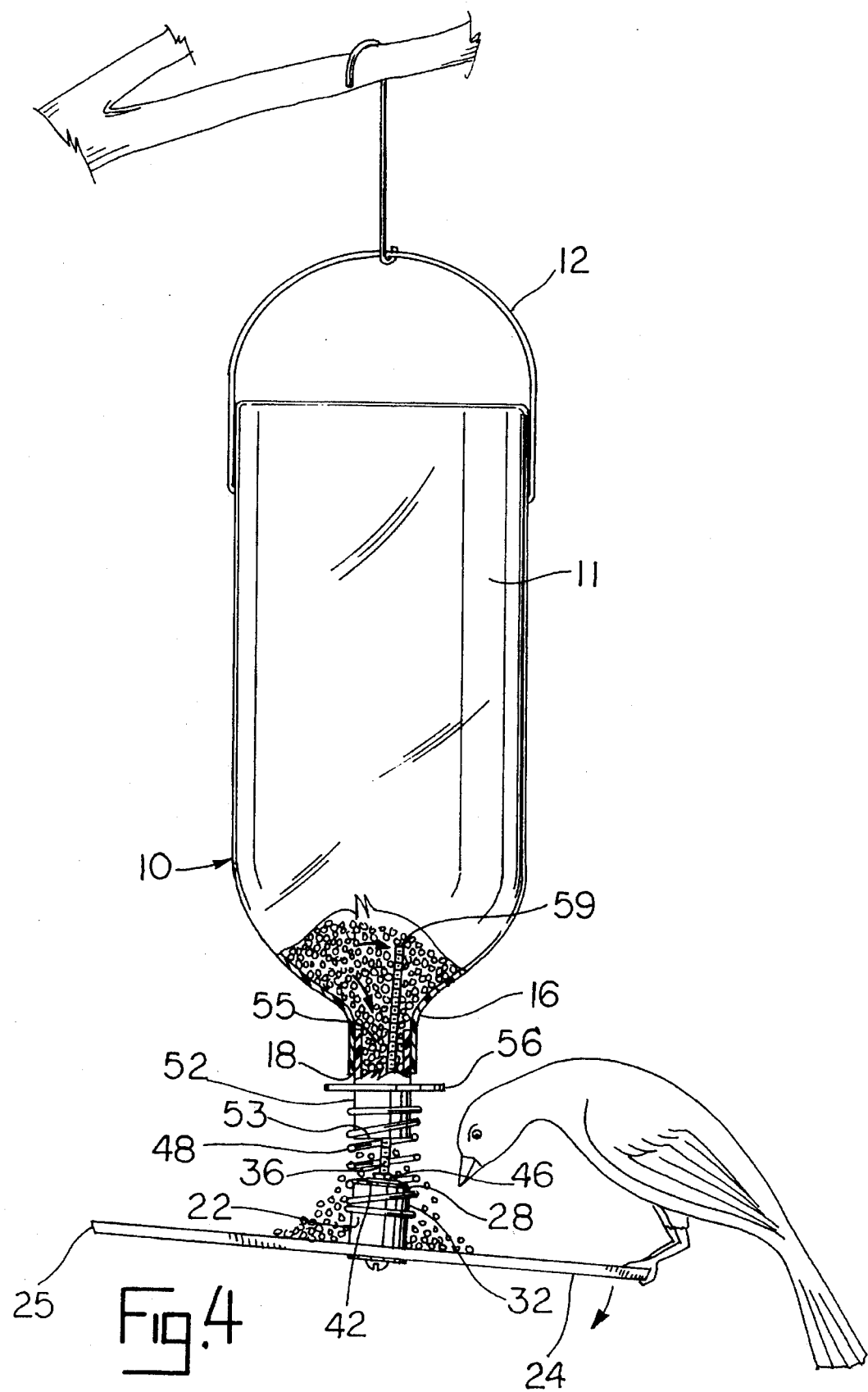

5,479,879

BIRD FEEDER

BACKGROUND OF THE INVENTION

The present invention relates generally to animal feeding devices. More specifically, the present invention relates to bird feeders.

It is desirable that bird feeders stay clean and dry. Because bird feed is relatively costly, feeders must not dispense feed in such quantity that it spills onto the ground, but a feeder must dispense sufficient feed so that birds are not left hungry. A bird feeder should also be adjustable to accommodate different types and sizes of bird feed, as well as different sizes and weights of feeding birds.

The feed containers of prior art feeders are generally an integral part of the bird feeder, and thus the containers eventually become dirty, damp, and musty. Further, because the flow rate of prior art feeders is not adjustable, they dispense too much or too little feed, and tend not to be suitable for more than one type of feed. Finally, prior art feeders dispense feed at a constant rate, regardless of the number and weight of birds using the feeder.

SUMMARY OF THE INVENTION

The present invention eliminates the problem of too little or too much feed being dispensed because feed is dispensed as a function of the weight and motion of feeding birds. Movement of the birds stimulates the flow of feed and prevents clogging. The present bird feeder invention is adjustable to accommodate the type of feed being used and the weight and number of birds using the feeder. A removable container is used, thereby eliminating the problem of damp, dirty, or musty feeders.

Accordingly, it is an object of this invention to provide a bird feeder that distributes bird feed and is activated by the weight and motion of the feeding birds.

Another object of the invention is to provide a bird feeder that prevents clogging and facilitates free but measured flow of the bird feed.

Another object of the invention is to allow the use of one feeder that will adjust to the different types and sizes of available bird feed.

Another object of the present invention is to provide a bird feeder that can be attached to a variety of feed container sizes.

Still another object of the invention is to provide a self-regulating bird feeder that can easily be attached to and removed from disposable and recyclable feed containers.

A still further object of the invention is to eliminate the need to clean damp or musty feed containers by utilizing recyclable and disposable feed containers.

BRIEF DESCRIPTION OF THE DRAWINGS

FIG. 4 is a view similar to FIG. 3 but illustrating the manner in which feed is dispensed from the container of the feeder to the platform thereof in response to a feeding bird.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to best enable others skilled in the art to follow its teachings.

Figure 1:
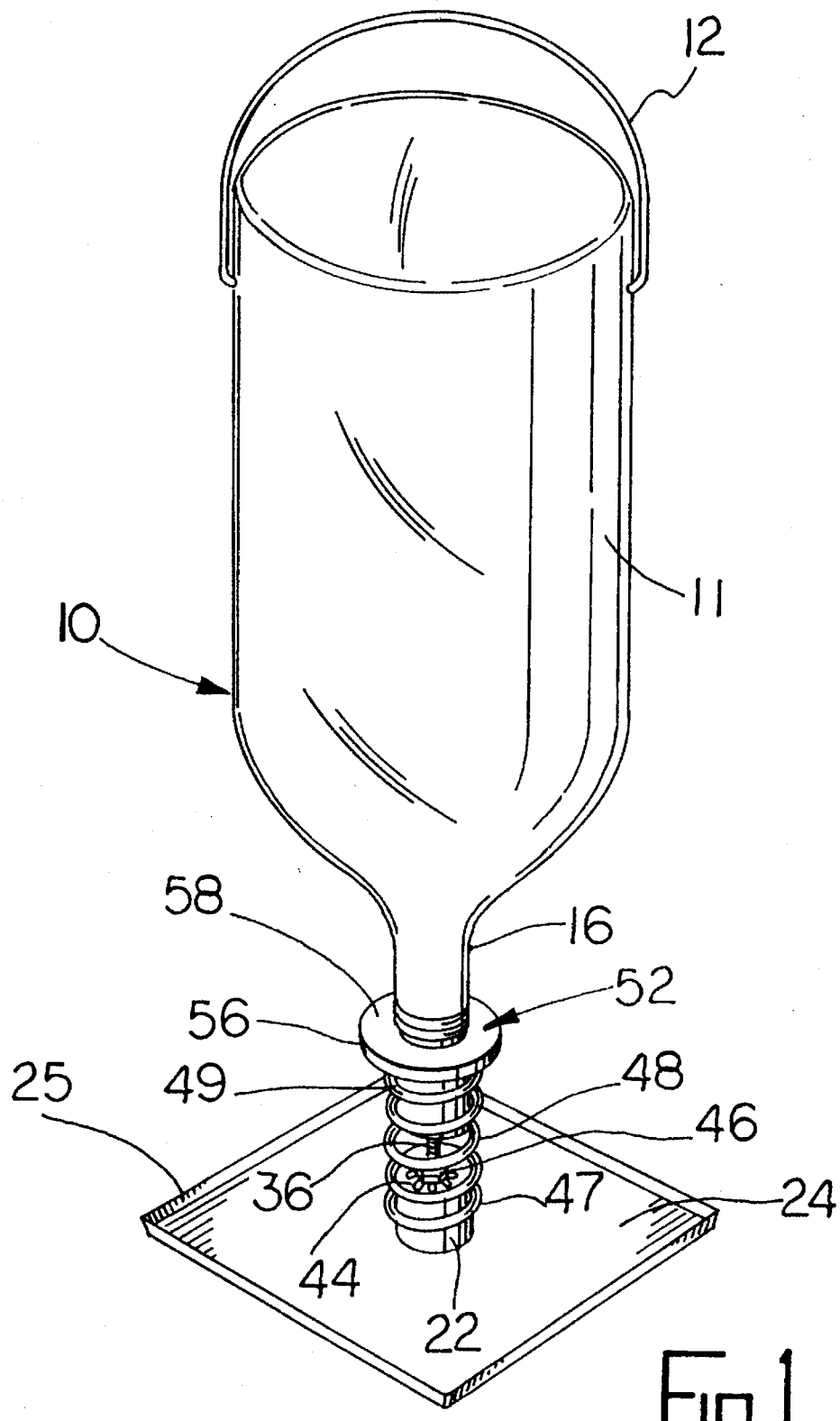
FIG. 1 is a perspective view of an animal feeding device made pursuant to one embodiment of the present invention.
Figure 2:
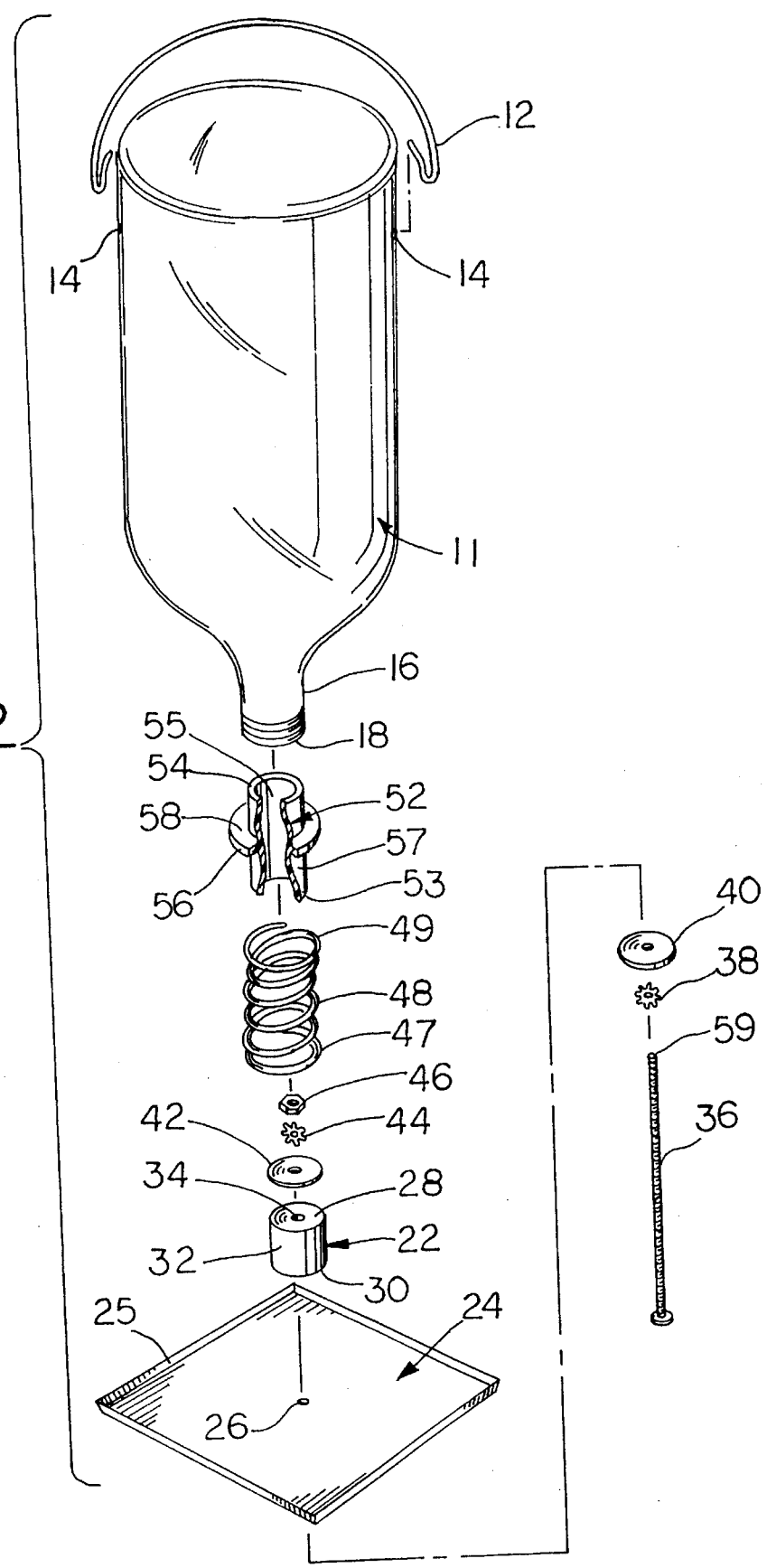
FIG. 2 is an exploded view in perspective of the animal feeder illustrated in FIG. 1.
Figure 3:
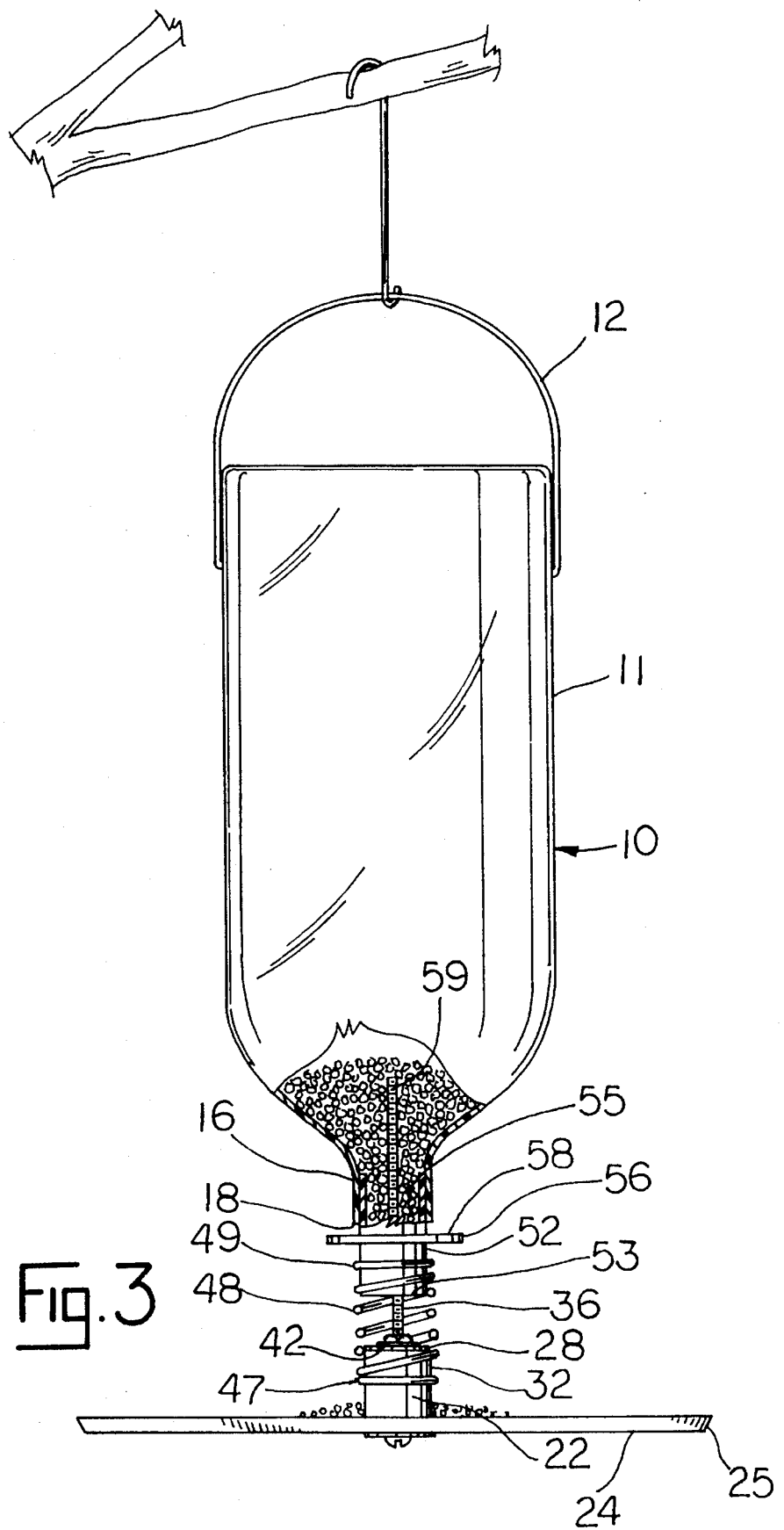
FIG. 3 is a side elevation view, partly in section, of the animal feeder illustrated in FIGS. 1 and 2.

Referring now to the drawings, a bird feeder generally indicated by the numeral 10 includes a feed container 11 adapted from a common two liter beverage container. A suspension wire 12 is inserted in suspension holes 14 which are punched on opposite sides of the container 11, to enable the feeder 10 to be suspended from an overhead support with the container 11 oriented in an inverted substantially vertical position. As shown in FIG. 2, the container 11 includes a neck 16 terminating in an opening 18. Accordingly, the container 11 may be filled prior to use by placing it in an upright position so that the neck 16 is pointing upward. The container 11 is then filled with animal feed through the opening 18 using a funnel or similar instrument to ease filling. As shown in FIGS. 3 and 4, feed is dispensed onto a platform 24 which also supports birds using the feeder 10.

As shown in FIG. 2, the platform 24 includes a rim 25 for maintaining feed on the platform. A substantially cylindrical dispersal member 22 includes ends 28 and 30 and a circumferentially extending outer surface 32. An aperture 34 extends through dispersal member 22 and registers with an aperture 26 in platform 24 to receive an elongated threaded rod 36 which extends through lock washer 38, plate washer 40, apertures 26 and 34, plate washer 42 and lock washer 44. Nut 46 tightly clamps end 30 of member 22 against the platform 24, with the remainder of threaded rod 36 projecting from end 28 of member 22.

The outer surface 32 of member 22 frictionally engages the interior of end portion 47 of regulating spring 48. Regulating spring 48 is of coil spring construction, with adjacent coils of regulating spring 48 defining dispensing openings 50 therebetween. The interior of opposite end portion 49 of spring 48 frictionally engages circumferentially extending outer surface 57 of one end portion 53 of flow housing 52. The outer surface 57 of the other end portion 54 of flow housing 52 frictionally engages the interior surface of opening 18 in neck 16 of container 11 so that the surface 58 of a collar 56 contacts the end of neck 16. Flow housing 52 defines a conveyance passage 55 through which feed is transferred from the container 11 to the feeding birds. The end 59 of threaded rod 36 extends coaxially through spring 48, conveyance passage 55 of housing 52, and through opening 18 and into interior of container 11, as shown in FIG. 3.

In operation, as illustrated in FIGS. 3 and 4, a bird lands on the platform 24 and perches on the rim 25. In response to the weight and motion of the bird, the spring 48 permits the platform 24 to rotate about a generally horizontal axis while the container 11 remains in a substantially vertical position. As the platform 24 moves, the agitator rod 36 also moves relative to the container 11. The agitator rod 36 disturbs the feed in the container 11, and the feed flows from the container 11 down through conveyance passage 55 of flow housing 52. The feed enters the interior of the regulating spring 48 and then contacts the upper portion 28 of member 32 and thus falls downward and outward through the dispensing openings 50 in the regulating spring 48 and onto the platform 24. To adjust the flow rate of the feed, the platform 24 may be rotated about a vertical axis so that the regulating spring 48 coacts with the edges of the washer 42 to draw the dispersal member 32 further into the end portion 47 of spring 48. Similarly, the regulating spring 48 may be rotated so that the end portion 53 of housing 52 is drawn further into end portion 49 of spring 48. Accordingly the gap between the end 53 of housing 52 and the end 28 of member 22 may be increased or decreased thus increasing or decreasing the flow of feed.

It is possible to further adjust the flow rate of the feed by varying the shape of the upper surface 28 of member 22. For example, the upper surface 28 may be conical or hemispherical in shape in order to accommodate different sizes of bird feed, or to increase or decrease the flow rate as desired. Alternatively, member 22 can be omitted entirely, by attaching the lower portion 47 of spring 48 directly to the platform 24.

To assemble the bird feeder 10, the container is filled as outlined above. With neck 16 pointing upward, housing 52 is inserted into opening 18 in neck 16 of container i 1. To achieve full insertion, collar 56 provides leverage so that surface 58 of housing 52 contacts the end of neck 18. End 59 of agitator rod 36 is inserted through the lock washer 38, plate washer 40, mounting hole 25 of the platform 24, mounting hole 34 of member 32, and plate washer 42 and lock washer 44. Nut 46 is threaded on rod 36 to clamp dispersal member 32 tight against platform 24, so that agitator rod 36 is generally vertical. Lower portion 47 of spring 48 is frictionally engaged over outer surface 32 of member 22, and spring 48 is rotated clockwise to achieve the desired insertion of member 32 into spring 48. End portion 49 of spring 48 is frictionally engaged over end portion 53 of housing 52, rotating clockwise to achieve full insertion. The entire feeder is then inverted and suspended from a branch or support using wire 12 as shown in FIGS. 3 and 4.

It is understood that the above description does not limit the invention to the above-given details, but may be modified within the scope of the following claims.

I claim:

1. An animal feeding device comprising a container for storing animal feed, a platform for supporting an animal to be fed, and dispensing means mounted between the platform and said container for dispensing feed from the container and for securing the platform to the container but permitting relative movement between the container and the platform, said dispensing means including conveying means for conveying feed from said container to an opening in said dispensing means and further including regulating means responsive to said relative movement between the container and the platform for regulating the flow of feed from the container to the opening, said conveying means including a flow housing defining a passage for conveying feed from the container to the opening, one end of said flow housing being attached to the container and the other end of said flow housing being attached to said regulating means, said regulating means including a coil spring, said coil spring being attached to said other end of said flow housing and to the platform, said regulating means further including an agitator rod for stimulating the flow of feed.

2. An animal feeding device as claimed in claim 1, wherein said agitator rod is attached to the platform and extends through said passage and into the container.

3. An animal feeding device as claimed in claim 2, wherein said flow housing includes a portion extending into said container and a collar engaging said container for positioning said portion within the container.

4. An animal feeding device as claimed in claim 1, wherein said spring is a coil having a pair of end portions, one of said end portions being attached to said flow housing, the other end portion being attached to the platform.

5. An animal feeding device as claimed in claim 1 wherein the feed container comprises a beverage container.

6. An animal feeding device as claimed in claim 1, wherein the platform includes dispersal means for dispersing feed from the conveying means about the platform.

7. An animal feeding device as claimed in claim 6, wherein said dispersal means comprises a generally cylindrical member having a pair of ends, one end of said dispersal member being attached to said regulating means and the other end of said dispersal member being attached to the platform.

* * * * *